United States Patent [19]

Reeves, Jr.

[11] Patent Number: 4,531,926
[45] Date of Patent: Jul. 30, 1985

[54] ADJUSTABLE PITCH SPROCKET

[76] Inventor: James B. Reeves, Jr., 1315 Whitman Dr., Glen Burnie, Md. 21061

[21] Appl. No.: 512,540

[22] Filed: Jul. 11, 1983

[51] Int. Cl.³ .............................................. F16H 9/02
[52] U.S. Cl. ....................................... 474/49; 474/162
[58] Field of Search .................. 474/162, 163, 47, 49, 474/56, 50, 152

[56] References Cited

U.S. PATENT DOCUMENTS

| 708,232 | 9/1902 | Jackling | 474/162 X |
| 711,932 | 10/1902 | Bisbee | 474/162 X |
| 1,486,590 | 3/1924 | Landahl | 474/163 X |

FOREIGN PATENT DOCUMENTS

| 3062 | 2/1905 | United Kingdom | 474/56 |
| 481362 | 3/1938 | United Kingdom | 474/56 |

Primary Examiner—James A. Leppink
Assistant Examiner—Frank H. McKenzie, Jr.

[57] ABSTRACT

As the sprocket teeth wear, the pitch of the sprocket teeth decreases. As the chain wears, the pitch of the chain increases, this causes the rate of wear to increase. A sprocket after being in use for 1000 hours may have four times the wear as it had after 500 hours use. This invention, a sprocket with simultaneous adjustable pitch of the teeth, will keep the wear rate to the minimum.

3 Claims, 9 Drawing Figures

ADJUSTABLE PITCH SPROCKET

DESCRIPTION OF TERMS

SPROCKET PITCH: The distance between the center of one chain pin to the center of the adjacent chain pin.

SPROCKET TOOTH ROOT DIAMETER: Twice the distance from the bottom of one sprocket tooth to the center of the sprocket.

SPROCKET PITCH DIAMETER: The sprocket tooth root, diameter plus the diameter of one chain pin or bushing. (if the chain has bushings).

SPROCKET OUTSIDE DIAMETER: Twice the distance from the outer point of sprocket tooth to center of sprocket.

SPROCKET TOOTH SHANK: The part of tooth extending towards center of sprocket to secure tooth to adaptor disc.

It is apparent from the foregoing that the present invention provides an adjustable pitch sprocket effecting equal pitch adjustment of all sprocket teeth simultaneously, with gradual adjustment over a wide range being obtainable. Moreover, the tapered shank adjustment bolts assure positive and gradual adjustment without danger of being broken. The adjustable pitch sprocket may be used in applications where existing sprockets fit splined shafts or have expensive hubs, simply by adapting the existing hub to the adaptor disc, and may be substituted for existing sprockets without the necessity of replacing the existing chain carried by the sprocket.

DETAILED DESCRIPTION

Figure 1:
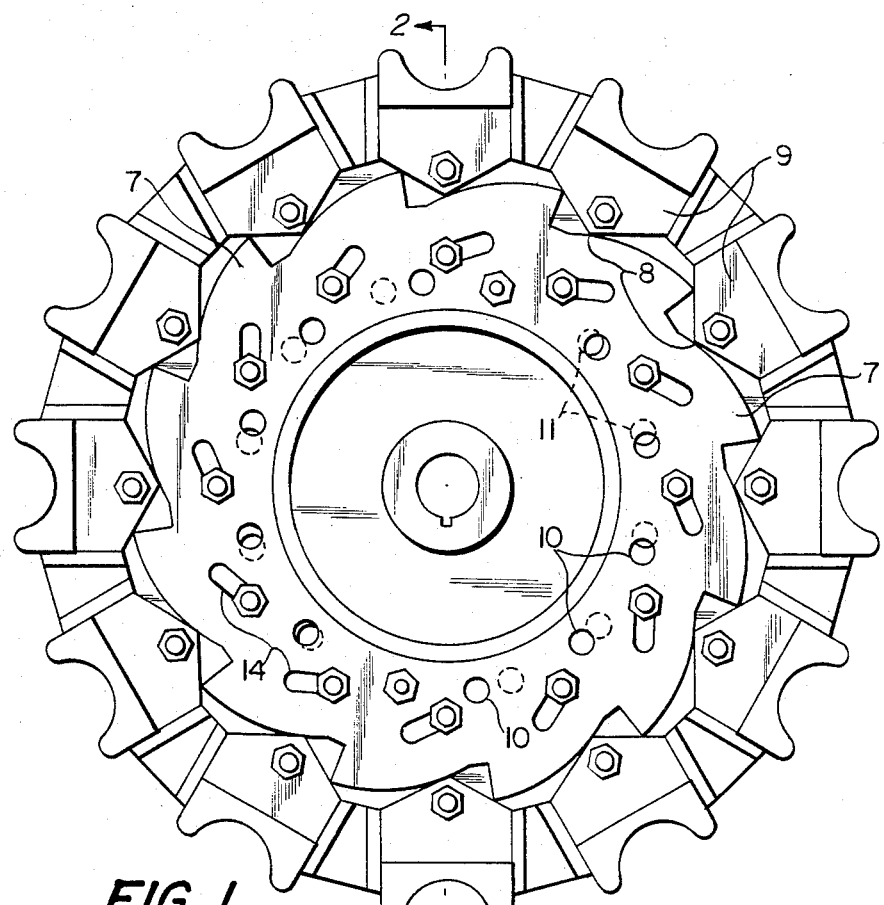
FIG. 1 shows a front view of an adjustable pitch sprocket assembly.
Figure 2:
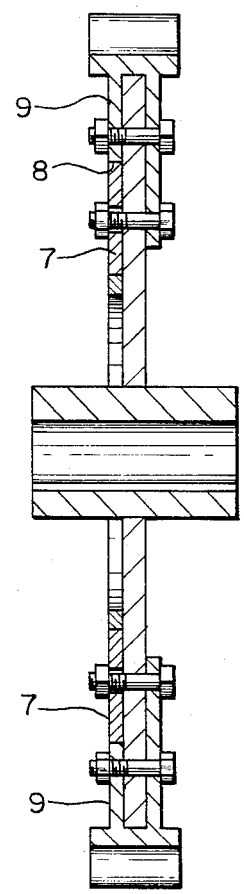
FIG. 2 shows a cross sectional view of FIG. 1.
Figure 3:
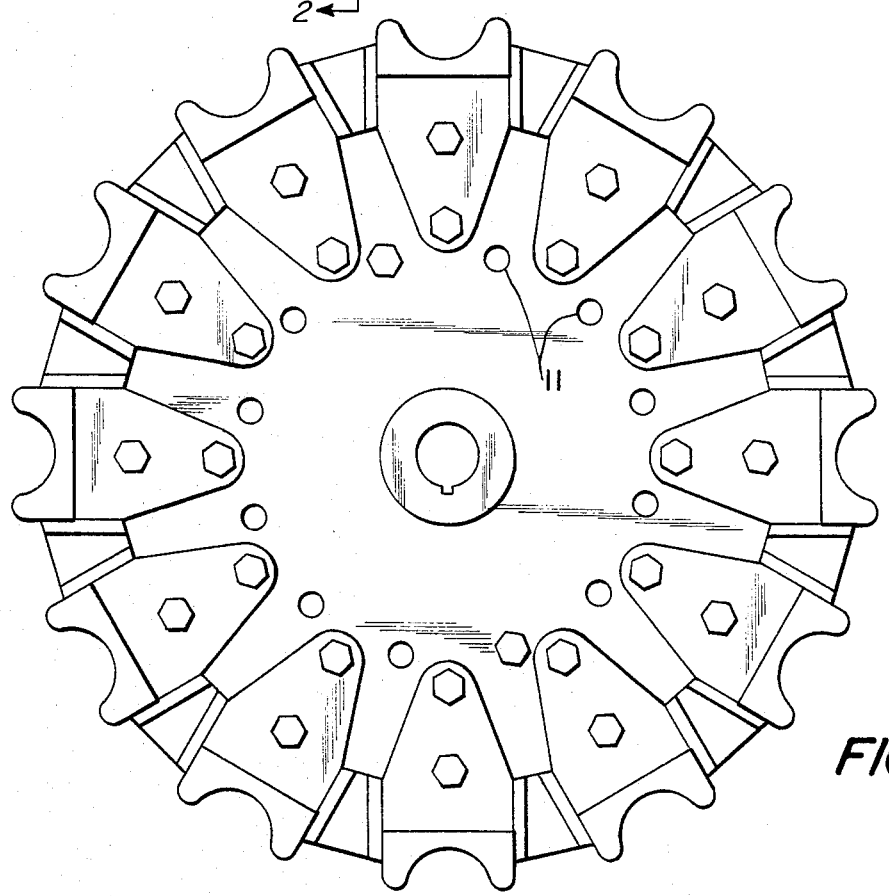
FIG. 3 shows a rear view of an adjustable pitch sprocket assembly.
Figure 4:
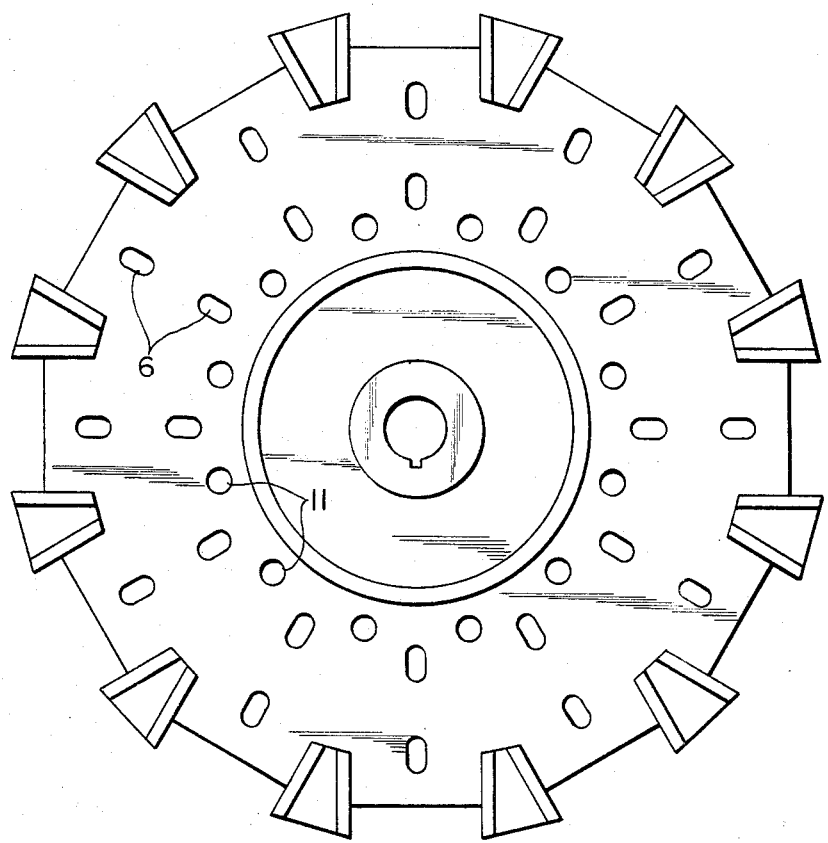
FIG. 4 shows a front view of an adaptor disc.
Figure 5:
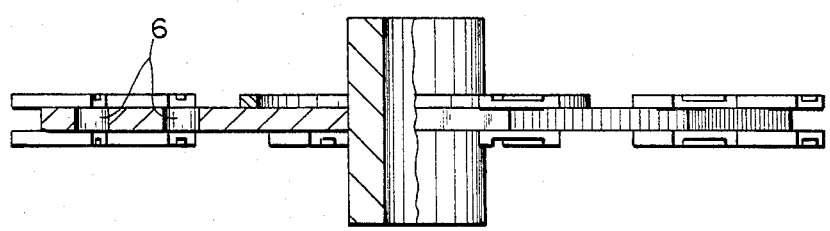
FIG. 5 shows a side or end view of an adaptor disc with a sectional view of a hub.
Figure 6:
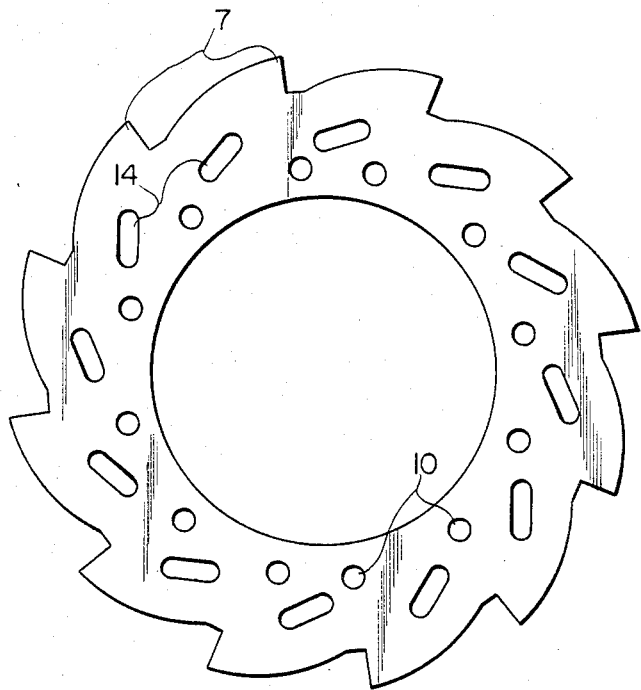
FIG. 6 shows a front view of a pitch adjustment disc.
Figure 7:
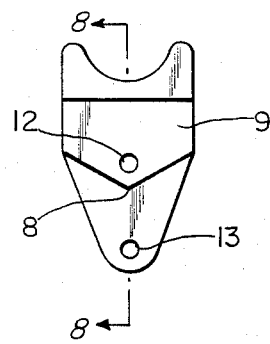
FIG. 7 shows a front view of an adjustable tooth.
Figure 8:
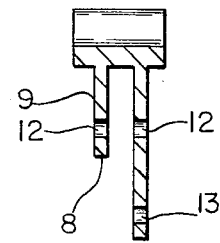
FIG. 8 shows a cross sectional view of FIG. 7.
Figure 9:
FIG. 9 shows a tapered shank adjustment bolt.

The sprocket assembly would consist of five different parts: an adaptor disc (or plate), shown in FIG. 4, a pitch adjustment disc (or ring), shown in FIG. 6, individual adjustable teeth, shown in FIG. 7, tapered shank adjustment bolts shown in FIG. 9, and standard bolts, which may be used to secure teeth to the adaptor disc.

The teeth would be secured to the adaptor disc with bolts. The teeth would be mounted individually, with bolts through the slotted bolt holes 6 in the adaptor disc allowing the teeth to be adjusted from the center of the disc outward, thereby increasing the pitch diameter. The adjustment would be accomplished with an adjustment disc of the type shown in FIG. 6. The adjustment disc would have a number of protruding areas 7 (one or two each) equal to the number of teeth. The tooth shorter shank 9 would have an inner surface 8 on one side of the adaptor disc bearing against the pitch adjustment disc protruding areas 7 (i.e., against the adjustment disc cam surface). When rotated, the adjustment disc forces all teeth outward simultaneously. This action increases the pitch diameter of all teeth and in turn increases the distance (known as the sprocket pitch) between all teeth equally. The adjustment disc and the adaptor disc will have a series of bolt holes 10, 11 on the same diameter bolt circle. Each of these holes for one half of the bolt circle would be offset (as to distance apart by 25 percent of the hole size). That is, the bolt holes 10, 11 along each 180 degree arc, are arcuately offset from one another due to the unequal arcuate spacing between the bolt holes through one of the discs. When the adjustment bolts shown in FIG. 9 are inserted in the mismatched holes 10, 11 and the nuts tightened on the bolts, the adjustment disc will be forced to rotate (by 25 percent of the hole diameter distance) by the action of the axially extending wedge surface provided by the conical cam surface around the shank of the tapered adjustment bolt, thereby adjusting all teeth. The holes on the one half of the adjustment disc will be exactly 180 degrees from the opposite holes. To adjust the sprocket pitch it is necessary to loosen all bolts in all teeth, insert. Insert two adjustment bolts in through both pairs of opposite holes 10, 11 that are 25 percent mismatched, tighten the nuts on the two adjustment bolts until the sprocket is in pitch with the chain, and then tighten all tooth shank bolts. If one hole adjustment is not sufficient to adjust the pitch, remove the two adjustment bolts and insert them in the next adjoining holes 10, 11 which have been brought within 25 percent of alignment during the previous hole alignment. This procedure may be continued until the sprocket is adjusted to the correct pitch to match the chain's pitch, or the total adjustment allowed is accomplished.

The teeth, shown in FIG. 7, would be secured to the adaptor disc, shown in FIG. 4, with standard bolts. The teeth would be mounted individually, with bolts through the slotted bolt holes, 6 in the adaptor disc, shown in FIG. 4, allowing the teeth to be adjusted from the center of the disc outward (or radially), thereby increasing the pitch diameter. The adjustment would be accomplished with an adjustment disc, shown in FIG. 6. The adjustment disc would have a number of protruding areas 7 (one or two each) for each of the teeth. The shorter shank would have an inner surface 8 on one side of the adaptor disc, bearing against the pitch adjustment disc protruding area 7. When rotated, the adjustment disc forces all teeth outward simultaneously. This action increases the pitch diameter of all teeth and in turn increases the distance (known as the sprocket tooth pitch) between all teeth equally. The adjustment disc and the adaptor disc will have a series of bolt holes, 10 & 11 on the same diameter bolt circle. Each of these holes for one half of the bolt circle would be offset, (as to distance apart by 25 percent of the hole size). When the adjustment bolts, shown in FIG. 9, are inserted in the mismatched holes, 10 & 11 and the nuts tightened on the bolts, the adjustment disc will be forced to rotate (by 25 percent of the hole diameter distance), thereby adjusting all teeth. The holes, 10 on the one half of the adjustment disc will be exactly 180 degrees from the opposite holes. To adjust the sprocket pitch it is necessary to loosen all bolts in all teeth insert two adjustment bolts in opposite holes, 10 & 11 that are 25 percent mismatched, tighten the nuts on the two adjustment bolts until the sprocket is in pitch with the chain, and then tighten all tooth shank bolts. The outer bolts are secured through holes 6 and 12. The inner bolts are secured through holes 6, 13, and 14. If one hole is not sufficient to adjust pitch, remove the two adjustment bolts and insert them in the next adjoining holes, 10 & 11 which have been brought within 25 percent of alignment from the previous hole alignment. This procedure may be continued until the sprocket is adjusted to the correct pitch to match the chain pitch, or the total adjustment allowed is used up.

It is apparent from the foregoing that the present invention provides an adjustable pitch sprocket effecting equal pitch adjustment of all sprocket teeth simultaneously, with gradual adjustment over a wide range being obtainable. Moreover, the tapered shank adjustment bolts assure positive and gradual adjustment without danger of being broken. The adjustable pitch sprocket may be used in applications where existing sprockets fit splined shafts or have expensive hubs, simply by adapting the existing hub to the adaptor disc, and may be substituted for existing sprockets without the necessity of replacing the existing chain carried by the sprocket.

I claim:

1. An adjustable sprocket, to be used in a chain drive, to compensate for chain and tooth wear by selective adjustment to move tooth portions of the sprocket radially outward, comprising:

an adaptor disc having means for mounting the disc for rotation about a sprocket axis;

a plurality of separate individual sprocket teeth;

means mounting each of said teeth on said adaptor disc to be fixed in the rotational direction of the disc and the axial direction of the disc, and for radial relative adjustment motion between the teeth and adaptor disc;

adjustment means mounted on said disc for driving each of said teeth radially outward to adjust the teeth and compensate for both tooth and chain wear;

means for selectively locking said teeth fixedly to said adaptor disc in an adjusted position to produce a rigid sprocket assembly, and unlocking said teeth selectively to permit said radial adjustment motion between said teeth and said adaptor disc; and said adjustment means including an adjustment disc coaxially mounted on said adaptor disc for limited relative rotation, one of said discs having an annular array, at a fixed diameter, of axially extending bolt holes evenly spaced from each other, the other of said disks having a number of axially through bolt holes equal in number to the bolt holes of said one disc and being in an annular array of said diameter, said holes of said other disc having unequal spacing from each other and being axially misaligned with the holes of said one disc in pairs so that the misalignment varies from one pair of misaligned holes to another pair of misaligned holes around the array, and pin means, having an axially extending wedge surface, for inserting in a selected pair of misaligned holes to forceably align said holes and thereby relatively rotate said discs, and said adjustment disc having radially outwardly facing cam surfaces respectively engaging each of said teeth for driving said teeth radially outward to adjust them for wear when said pin means relatively rotates said discs.

2. The sprocket of claim 1, wherein said pin means is a bolt having a conical cam surface.

3. The sprocket of claim 2, wherein each of said teeth includes an outermost chain engaging portion and parallel depending radially inwardly extending shank portions fitting on opposite sides of said adaptor disc; one of said shank portions being longer, radially, than the other of said shank portions and having a hole therein for receiving therein bolt means radially inward of the other shank portion, said other shank portion having a radially inwardly directed cam surface engaging one of said adjustment disc cam surfaces at a position radially outward of said diameter.

* * * * *